United States Patent [19]

Miyadera et al.

[11] Patent Number: 5,117,416
[45] Date of Patent: May 26, 1992

[54] RECORDING METHOD FOR MULTI-LAYER RECORDING FILM

[75] Inventors: Toshiyuki Miyadera; Makoto Okano; Fumio Matsui, all of Saitama, Japan

[73] Assignee: Pioneer Electronic Corporation, Tokyo, Japan

[21] Appl. No.: 601,636

[22] Filed: Oct. 23, 1990

[30] Foreign Application Priority Data

May 15, 1990 [JP] Japan .................................. 2-126104

[51] Int. Cl.$^5$ ........................... G11B 3/70; G11B 5/84; G11B 7/26; G11B 7/00
[52] U.S. Cl. ................................... 369/284; 369/125; 430/333
[58] Field of Search ............... 369/283, 284, 100, 108, 369/125; 430/333

[56] References Cited

U.S. PATENT DOCUMENTS

| 4,183,094 | 1/1980 | Keezer | 369/100 |
| 4,767,696 | 8/1988 | Ishimoto | 430/495 |
| 4,845,021 | 7/1989 | Miyazaki | 430/333 |

Primary Examiner—Stuart S. Levy
Assistant Examiner—Michael C. Kessell
Attorney, Agent, or Firm—Sughrue, Mion, Zinn, Macpeak & Seas

[57] ABSTRACT

A recording and readout method for a multi-layer recording film including providing a multi-layer recording film comprising a laminate of plural recording films having a light absorption band in a predetermined wavelength region and having an intrinsic absorption peak; and supplying to the multi-layer recording film a light having a wavelength which is substantially the same as that of the absorption peak of each recording film to effect recording and readout; wherein provided that the light absorption band of the recording film having the absorption peak on the longer wavelength side selected from adjacent absorption peaks is present in a wave length region which is shorter than the absorption peak wavelength on the shorter wavelength side; the recording film having the absorption peak on the shorter wavelength side is caused to have an absorbance which is higher than the absorbance of the recording film having the absorption peak on the longer wavelength side at the absorption peak wavelength on the shorter wavelength side; and the recording film having the absorption peak on the shorter wavelength side is irradiated with a light having a wavelength which is shorter than the light absorption band of the recording film having the absorption peak on the longer wavelength side.

3 Claims, 3 Drawing Sheets

RECORDING METHOD FOR MULTI-LAYER RECORDING FILM

FIELD OF THE INVENTION AND RELATED ART

The present invention relates to a recording and readout method using a multi-layer recording film, particularly to a recording and readout method using a multi-layer film wherein the light absorption bands for recording films constituting the multi-layer film overlap with each other.

Recently, various recording films such as dye film have been developed as recording films for optical recording media. For example, in the case of the dye film, a semiconductor laser beam having a predetermined wavelength is concentrated on a dye film formed on a substrate by spin coating, etc., and the laser beam is converted into heat energy to change the property and state of the dye film, whereby recording is effected. Further, readout is effected by utilizing the difference in reflection light quantity or transmission light quantity between the resultant recorded portion and non-recorded portion.

However, in the conventional optical recording medium, the recording density (or packing density) is limited to $10^8$ bit/cm$^2$ on the basis of the diffraction limit of the light to be used for access. Accordingly, there has been desired an optical recording medium which is adaptable to high-density recording to be used in a highly developed information-oriented society.

As one of the means for enhancing the recording density of an optical recording medium, there is a method wherein an optical recording medium capable of vertical (or perpendicular) recording is used and the recording density per unit volume is improved. In this method, a multi-layer recording film is formed by laminating plural recording films respectively having absorption peaks corresponding to different wavelengths, and the resultant multi-layer recording film is irradiated with light having wavelengths which are substantially the same as the absorption peak wavelengths for the above-mentioned respective recording films to effect recording and readout, whereby vertical recording in an optical recording medium is enabled.

However, in a case where a multi-layer recording film is formed by laminating plural recording films respectively having absorption peaks corresponding to different wavelengths, when the light absorption bands for respective recording films constituting the multi-layer film overlap with each other, there has been posed a problem such that recording cannot be effected independently of each other.

Such a problem is explained on the basis of FIGS. 6 to 8.

FIG. 6 is a graph showing spectral characteristics of recording films A and B having absorption bands overlapping with each other. In FIG. 6, the solid line denotes an absorption curve in a multi-layer state, and the dotted line denotes an absorption curve in the single layer state of the recording film A or B. In FIG. 6, the recording films A and B respectively have absorption peak wavelengths $\lambda a$ and $\lambda b$, and the light absorption bands Wa and Wb of the recording films A and B overlap with each other. The light absorption band Wb of the recording film B extends to a shorter wavelength region than the absorption peak wavelength $\lambda a$ of the recording film A.

When such a multi-layer recording film is irradiated with light having the same wavelength as the absorption peak wavelength $\lambda a$ of the recording film A for the purpose of recording, the absorbance of the recording film A is decreased as shown by a solid line in FIG. 7. However, the absorbance of the recording film B is also decreased since the light absorption band Wb is present at the wavelength $\lambda a$. On the other hand, when such a multi-layer recording film is irradiated with light having the same wavelength as the absorption peak wavelength $\lambda b$ of the recording film B for the purpose of recording, the absorbance of the recording film B is decreased as shown by a solid line in FIG. 8. However, the absorbance of the recording film A is also decreased along with the decrease in the absorbance of the recording film B, since the light absorption band Wb of the recording film B is present at the absorption peak wavelength $\lambda a$ of the recording film A.

Accordingly, the recording film B is also recorded simultaneously with the recording of the recording film A. On the other hand, the absorbance at the wavelength $\lambda a$ is also changed simultaneously with the recording of the recording film B, whereby, each of the recording films A and B cannot be recorded independently.

SUMMARY OF THE INVENTION

A principal object of the present invention is, in view of the above-mentioned problems encountered in the prior art, to provide a recording/readout method capable of independently effecting recording on respective recording films constituting a multi-layer recording film even when the light absorption bands of these recording films overlap with each other.

According to the present invention, there is provided a recording/readout method for a multi-layer recording film comprising: providing a multi-layer recording film comprising a laminate of plural recording films having a light absorption band in a predetermined wavelength region and having an intrinsic absorption peak; and supplying to the multi-layer recording film a light having a wavelength which is substantially the same as that of the absorption peak of each recording film to effect recording and readout;

wherein provided that the light absorption band of the recording film having the absorption peak on the longer wavelength side selected from adjacent absorption peaks is present in a wavelength region which is shorter than the absorption peak wavelength on the shorter wavelength side; the recording film having the absorption peak on the shorter wavelength side is caused to have an absorbance which is higher than the absorbance of the recording film having the absorption peak on the longer wavelength side at the absorption peak wavelength on the shorter wavelength side; and the recording film having the absorption peak on the shorter wavelength side is irradiated with a light having a wavelength which is shorter than the light absorption band of the recording film having the absorption peak on the longer wavelength side.

In the present invention, when one recording film having an absorption peak on the longer wavelength side selected from adjacent absorption peaks is irradiated with a light having a wavelength which is substantially the same as the absorption peak wavelength of the above-mentioned recording film so as to effect recording, the absorbance of the recording film is decreased.

At this time, the absorbance at the absorption peak wavelength on the shorter wavelength side is also decreased since the light absorption band of the recording film having the absorption peak on the longer wavelength side is also present in a further short wavelength region than the absorption peak on the shorter wavelength side. In the present invention, however, since the absorbance of the recording film having the absorption peak on the shorter wavelength side is set to a higher value than the absorbance of the recording film having the absorption peak on the longer wavelength side, the decrease at the absorption peak wavelength on the shorter wavelength side becomes very little.

On the other hand, when the recording film having the absorption peak on the shorter wavelength side is irradiated with a light having a wavelength which is shorter than that of the light absorption band of the above-mentioned recording film having the absorption peak on the longer wavelength side so as to effect recording, the absorbance of the recording film having the absorption peak on the shorter wavelength side is decreased without decreasing the absorbance of the recording film having the absorption peak on the longer wavelength side, whereby recording is effected.

As a result, according to the present invention, respective recording films are capable of effecting recording and readout independently of each other, even when the multi-layer recording film comprises a laminate of recording films wherein the light absorption band of the recording film having an absorption peak on the longer wavelength side which is selected from adjacent absorption peaks, is present even in a further short wavelength region than the absorption peak on the shorter wavelength region.

Hereinbelow, preferred embodiments of the present invention will be described with reference to the accompanying drawings.

BRIEF DESCRIPTION OF THE DRAWINGS

FIGS. 1 to 3 are schematic views for illustrating the recording and readout method for multi-layer recording film according to the present invention; wherein FIG. 1 is a graph showing a spectral characteristic of a recording film wherein light absorption bands overlap with each other; FIG. 2 is a graph showing a spectral characteristic of a state wherein recording is effected on a recording film having an absorption peak on the longer wavelength side; and FIG. 3 is a graph showing a spectral characteristic of a state wherein recording is effected on a recording film having an absorption peak on the shorter wavelength side;

FIGS. 6 to 8 are schematic views for illustrating the conventional recording and readout method for multi-layer recording film wherein FIG. 6 is a graph showing a spectral characteristic of a recording film wherein light absorption bands overlap with each other; FIG. 7 is a graph showing a spectral characteristic of a state wherein recording is effected on a recording film having an absorption peak on the shorter wavelength side; and FIG. 8 is a graph showing a spectral characteristic of a state wherein recording is effected on a recording film having an absorption peak on the longer wavelength side.

DETAILED DESCRIPTION OF PREFERRED EMBODIMENTS

Figure 1:
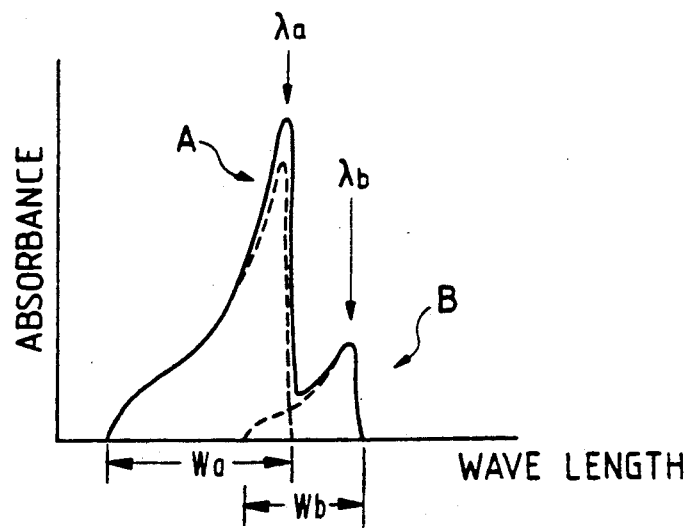
Figure 2:
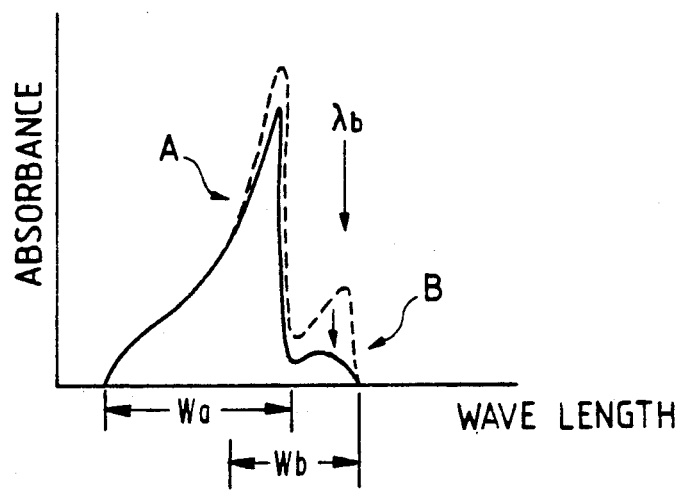
Figure 3:
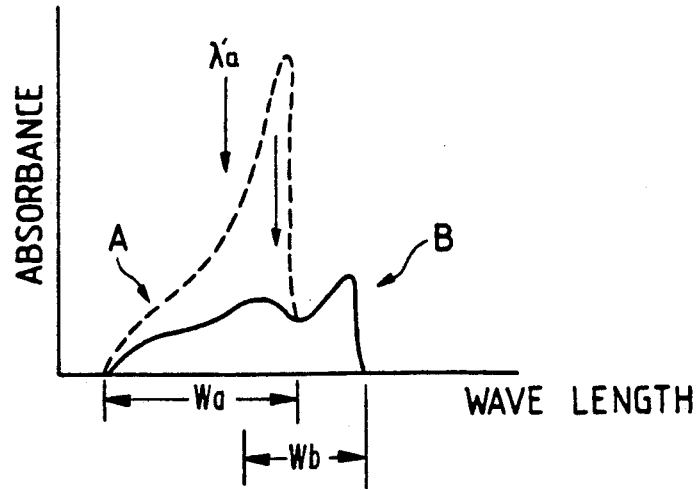

FIGS. 1 to 3 are schematic views for illustrating the recording and readout method for multi-layer recording film according to the present invention, wherein FIG. 1 is a graph showing a spectral characteristic of a recording film wherein light absorption bands overlap with each other.

In FIG. 1, the solid line denotes an absorption curve in a multi-layer recording film state and the dotted lines respectively denote absorption curves in single layer states of recording film A and B. In FIG. 1, the recording films A B have absorption peaks having maximum absorbances at the wavelengths of $\lambda a$ and $\lambda b$, respectively. The light absorption bands Wa and Wb of the recording films A and B overlap with each other, and the light absorption band Wb of the recording film B extends to a shorter wavelength region as compared with the absorption peak wavelength $\lambda a$ of the recording film A. Further, in the present invention, the absorbance at the wavelength $\lambda a$ of the recording film A having an absorption peak on the shorter wavelength side selected from the adjacent two absorption peaks is set to a greater value than that of the recording film B at the wavelength $\lambda a$.

In order to enhance the absorbance of the recording film A, there may ordinarily be used a method wherein the recording film A is caused to have a larger thickness.

Thus, in a case where the absorbance at the wavelength $\lambda a$ of the recording film A is set to a greater value than that of the recording film B at the same wavelength, when recording is effected on the recording film B by using light having a wavelength $\lambda b$, the rate of decrease in the absorbance at the wavelength $\lambda a$ along with the decrease in the absorbance of the recording film B may be minimized.

More specifically, in a case where recording is effected on the recording film B having an absorption peak on the longer wavelength side selected from the recording films A and B constituting the multi-layer recording films having the absorption curve as shown in FIG. 1, the recording is effected on the recording film B by supplying thereto a light having a wavelength which is substantially the same as that of the absorption peak of the recording film B, whereby the absorbance of the recording film B is decreased as shown by the solid line in FIG. 2. Further, since the light absorption band Wb of the recording film B is also present at the wavelength $\lambda a$ of the absorption peak of the recording film A, the absorbance at the wavelength $\lambda a$ is decreased along with the decrease in the absorbance of the recording film B. In the present invention, however, since the absorbance of the recording film A of the wavelength $\lambda a$ is greater than the absorbance of the recording film B at the same wavelength, the rate of the decrease in the absorbance at the wavelength $\lambda a$ based on the recording on the recording film B becomes very low. Accordingly, when a bias is applied at the time of readout from the recording film A, the decrease in the absorbance at the wavelength $\lambda a$ caused by the recording on the recording film B may be processed as a noise.

On the other hand, in the present invention, in a case where recording is effected on the recording film A having an absorption peak on the shorter wavelength side selected from the recording films A and B constituting the multi-layer recording films having the absorption curve as shown in FIG. 1, the recording is effected on the recording film A by supplying thereto a light having a wavelength $\lambda'a$ which is shorter than the light absorption band Wb of the recording film B, whereby the absorbance of the recording film A is decreased as shown by the solid line in FIG. 3. However, since the recording film B having the absorption peak on the longer wavelength side is not supplied with light having a wavelength in the light absorption band Wb, a decrease in the absorbance thereof does not occur.

As described above, in the present invention, in the case of recording and readout in the multi-layer recording film which comprises a laminate of the recording films A and B having light absorption bands overlapping with each other, the absorbance at the wavelength $\lambda a$ of the recording film A having an absorption peak on the shorter wavelength side is set to a higher value than the absorbance of the recording film B at the wavelength $\lambda a$. Further, in the present invention, recording is effected on the recording film B having an absorption peak on the longer wavelength side by supplying a light having a wavelength which is substantially the same as the wavelength $\lambda b$ of the absorption peak of the recording film B, and recording is effected on the recording film A having an absorption peak on the shorter wavelength side by supplying a light having a wavelength $\lambda'a$ which is shorter than the light absorption band Wb of the recording film B, whereby recording and readout are independently effected on the respective recording films.

In a case where the recording films constituting the multi-layer recording film includes a recording film having a light absorption band not overlapping with those of the other recording films, recording and readout may be effected on such a recording film by supplying thereto a light having a wavelength which is substantially the same as the absorption peak wavelength of the recording film per se, in the same manner as in the conventional recording/readout method.

Specific examples of the recording film applicable to the present invention include a film of a dye (or coloring matter), etc. Specific examples of recording films having light absorption bands overlapping with each other may include those comprising cyanine dyes represented by the following formulas (D-1) and (D-2).

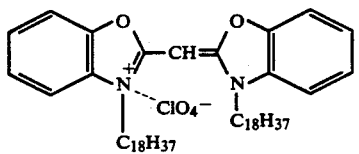

(D-1)

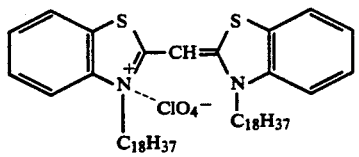

(D-2)

The cyanine dye D-1 has an absorption peak wavelength of about 400 nm in an association state in an Langmuir Blodgett (hereinafter LB) film as described hereinafter, and the cyanine dye D-2 has an absorption peak wavelength of about 450 nm in an association state in an LB film. Accordingly, the cyanine dye D-1 corresponds to the above-mentioned recording film A, and the cyanine dye D-2 corresponds to the above-mentioned recording film B.

The recording film may be formed by a known method such as a spin coating method, and dipping method. In a case where the entire laminate film may preferably be within the focal depth of the illumination light in view of the control of the illumination light, it is possible to form the recording film as a Langmuir-Blodgett film (LB film). Such a LB film (or layer) has a thickness of the order (or level) of molecule and is a uniform thin film wherein molecular orientation is controlled. Therefore, when the LB film is used as a recording film, the recording film formed on a substrate has a thickness which is about 1/10 times that of the recording film formed by spin coating, etc. The recording film formed by spin coating, etc., shows an absorption spectrum comprising a broad absorption. In the recording film formed as an LB film, however, a so-called "J-aggregate" is formed, and the absorption peak is shifted to the longer wavelength side and becomes sharper. As a result, a further preferred recording film may be produced.

Figure 4:
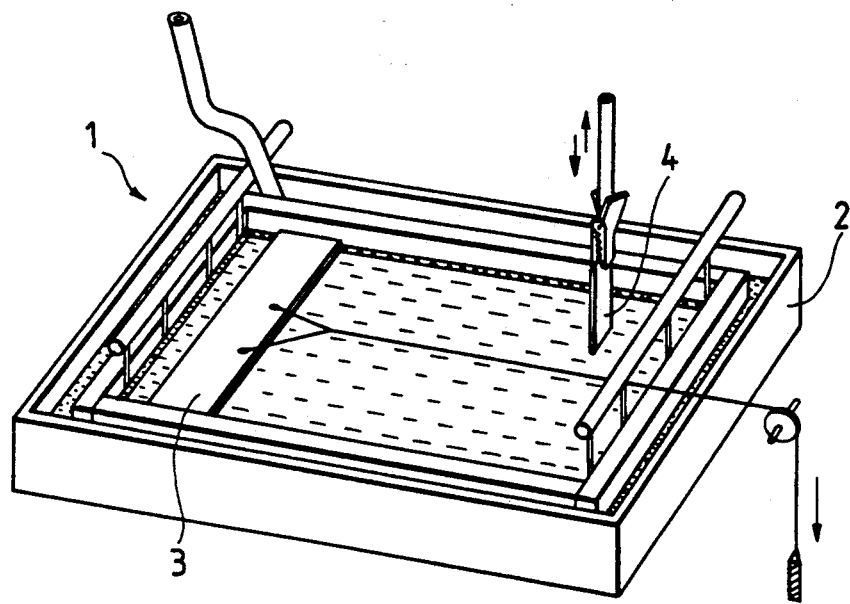
FIG. 4 is an embodiment of the device for preparing an LB film.

Then, a process for producing an LB film is described with reference to FIG. 4 FIG. 4 is a schematic perspective view showing an embodiment of the device for producing an LB film.

Referring to FIG. 4, the device 1 for producing an LB film is equipped with a water tank 2 for containing therein a subphase liquid. In preparation, a solvent containing a dye (or coloring matter) dissolved therein is dripped onto the subphase liquid. The thus dripped solvent spreads over the subphase liquid and is evaporated, and the dye molecules rapidly spread over a gas-liquid interface and are oriented so that hydrophilic groups protrude to the subphase liquid and hydrophobic groups protrude to the atmosphere, thereby to form a monomolecular film (or monolayer).

Then, a barrier 3 is moved right in the figure to apply a film pressure (or membrane pressure) to the monomolecular film so as to retain an aggregate film. In such a state, when a substrate 4 is vertically moved so that it crosses the liquid level (or surface), a dye LB film comprising a multi-molecular or monomolecular layer is formed on the substrate 4. In the above-mentioned preparation, distilled water which has been subjected to pH adjustment may be used as the subphase liquid. Further, a solvent having no-compatibility with water and having volatility such as benzene and chloroform may be used as the above-mentioned solvent. It is possible to add a film formation aid (or assistant) such as long-chain fatty acids and their derivatives to the above-mentioned solvent in addition to the dye.

The above-mentioned film pressure control for the mono-molecular film may be conducted on the basis of a $\pi$-A curve which has been derived from the film pressure ($\pi$) at the gas-liquid interface due to compression based on the barrier 3 and a change in the area (A) of the gas-liquid interface determined by the position of the barrier 3. Further, when the spectral characteristic of the dye is measured simultaneously with the above-mentioned measurement, the formation of the J-aggregate may also be confirmed by the shift of the absorption peak.

As substrate 4, it is possible to use a substrate which has a smooth surface and is sufficiently clean in view of surface chemistry. Specific examples thereof may include a substrate comprising metal, glass, organic polymer material, and silicone.

Hereinbelow, the present invention will be described in more detail with reference to Experimental Example.

EXAMPLE

A multi-layer recording film was prepared by laminating LB films on a substrate in the sequence of (D-1) to (D-2) under the following conditions. The dyes used herein were the cyanine dyes D-1 and D-2 represented by the above-mentioned formulas (D-1) and (D-2), respectively, and the device for LB film production was the LB film production device as shown by FIG. 4.

Substrate: glass substrate (having a surface subjected to hydrophobicity-imparting treatment.)
Solvent: chloroform
Dye concentration: 2 mmol/l (solvent)
Subphase liquid: distilled water (pH=6.8, water temperature=15° C.)
Barrier moving speed: 10 to 20 mm/min.
Substrate up-and-down speed: 5 mm/min.

Film Formation Condition for Cyanine Dye D-1

Film formation aid: stearic acid
((D-1): stearic acid=1:1)
Film pressure=35 dyne/cm Film Formation Condition for Cyanine Dye D-2

Film formation aid: stearic acid
((D-2): stearic acid=1:1)
Film pressure=35 dyne/cm A spectral characteristic of the above-prepared multi-layer recording film was measured. The results are shown in FIG. 5.

Figure 5:
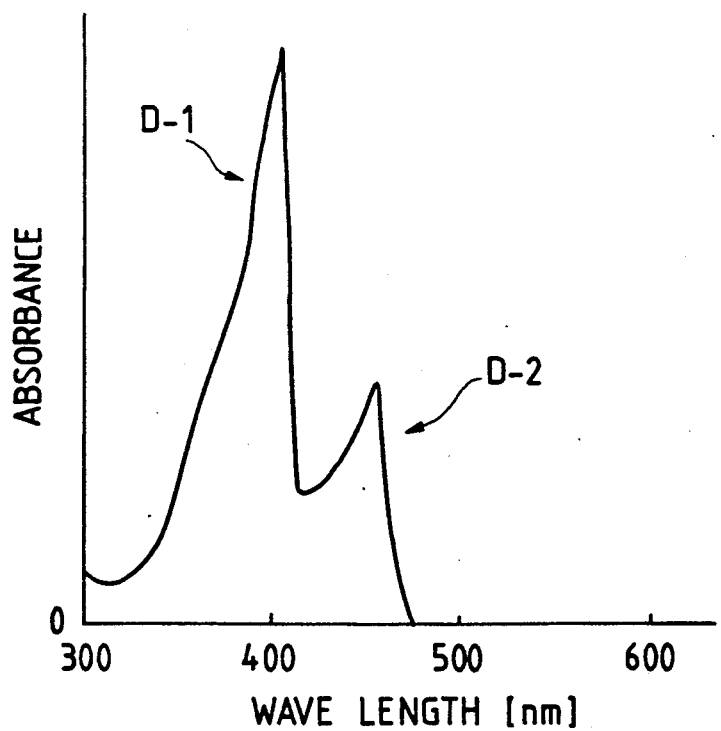
FIG. 5 is a spectral characteristic of a multi-layer recording film formed by laminating LB films.
Figure 6:
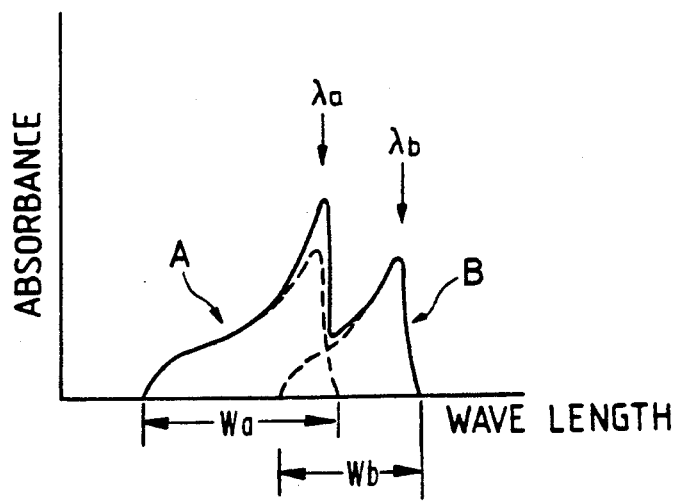
Figure 7:
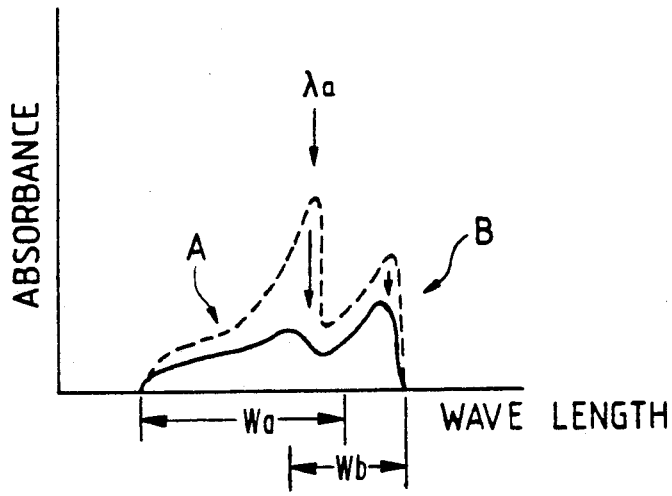
Figure 8:
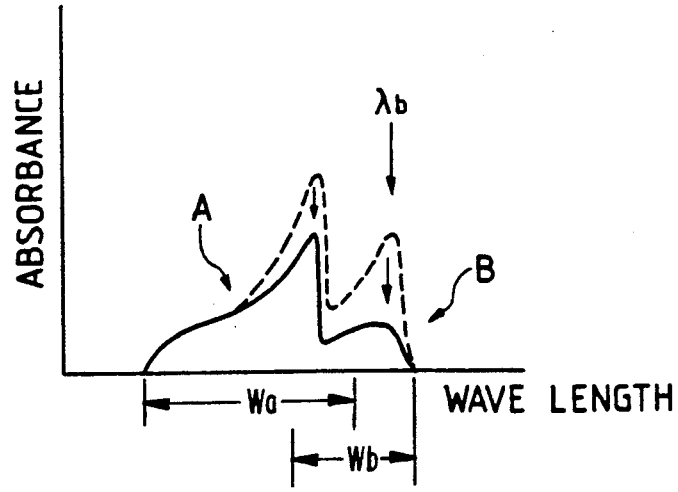

As shown in FIG. 5, the resultant multi-layer recording film had two adjacent absorption peaks at about 400 nm and about 450 nm, and the light absorption band of the recording film due to the cyanine dye D-2 was present in the range of 360 to 480 nm.

When such a multi-layer recording film was irradiated with light having a wavelength of 450 nm, the absorbance at 450 nm was considerably decreased but the absorbance at 400 nm was somewhat decreased. Further, when the multi-layer recording film was irradiated with light having a wavelength of 355 nm, the absorbance of the recording film at 400 nm was considerably decreased but a decrease in the absorbance of the recording film due to the cyanine dye (D-2) was not observed.

For the purpose of comparison, when the multi-layer recording film was irradiated with light having a wavelength of 400 nm, the absorbance at 400 nm was considerably decreased in the same manner as described above (Experiment Example), but the absorbance of the recording film at 450 nm was also decreased.

As described hereinabove, according to the present invention, there is provided a recording/readout method for a multi-layer recording film comprising a laminate of plural recording films having light absorption bands overlapping with each other.

More specifically, in the present invention, a recording film having an absorption peak on the shorter wavelength side is caused to have an absorbance which is higher than that of a recording film having an absorption peak on the longer wavelength side, recording and readout on the recording film having the absorption peak on the longer wavelength side is effected by supplying thereto a light having a wavelength which is substantially the same as the absorption peak wavelength of the recording film, and recording and readout on the recording film having the absorption peak on the shorter wavelength side is effected by supplying thereto a light having a wavelength which is shorter than the light absorption band of the recording film having the absorption peak on the longer wavelength side. As a result, in the present invention, recording and/or readout may independently be effected on each recording film even in the case of a multi-layer recording film comprising a laminate of recording films wherein the light absorption band of the recording film having an absorption peak on the longer wavelength side, which is selected from adjacent absorption peaks, is present in a wavelength region which is shorter than the absorption peak on the shorter wavelength side.

What is claimed is:

1. A recording method for a multi-layer recording film comprising:

providing a multi-layer recording film comprising a laminate of plural recording films, each of said films having a light absorption band in a predetermined wavelength region and each of said films having an intrinsic absorption peak; and supplying to the multi-layer recording film a plurality of light beams, such that each light beam has a wavelength within the absorption band of one of the respective recording films, to effect recording;

wherein, provided that the light absorption band (Wb) of the recording film (B) having the absorption peak ($\lambda$b) on the longer wavelength side selected from adjacent absorption peaks is present in a wavelength region which is shorter than the absorption peak wavelength ($\lambda$a) of the recording film (A) having the absorption peak ($\lambda$a) on the shorter wavelength side, the recording film (A) having the absorption peak ($\lambda$a) on the shorter wavelength side is caused to have an absorbance which is higher than the absorbance of the recording film (B) having the absorption peak ($\lambda$b) on the longer wavelength side at the absorption peak wavelength ($\lambda$a) on the shorter wavelength side, the recording film (A) having the absorption peak ($\lambda$a) on the shorter wavelength side is irradiated with one of said light beams, said one of said light beams having a wavelength ($\lambda'$a) which is shorter than the light absorption band (Wb) of the recording film (B) having the absorption peak ($\lambda$b) on the longer wavelength side, said wavelength ($\lambda'$a) also being shorter than said absorption peak ($\lambda$a) on the shorter wavelength side, and the recording film (B) having the absorption peak ($\lambda$b) on the longer wavelength side is irradiated with another one of said light beams, said another one of said light beams having a wavelength which is substantially the same as said absorption peak ($\lambda$b) on the longer wavelength side.

2. A recording method for a multi-layer recording film according to claim 1, wherein said step of providing a multi-layer recording film comprises providing a dye film.

3. A recording method for a multi-layer recording film according to claim 2, wherein said step of providing a multi-layer recording film comprises providing a film having an LB layer of a cyanine dye comprising a J-aggregate formed therein.

* * * * *